United States Patent [19]

Huthmacher

[11] Patent Number: 4,531,350
[45] Date of Patent: Jul. 30, 1985

[54] UNIVERSAL WHEELED ASSEMBLY FOR GRASS TRIMMERS

[76] Inventor: Edward A. Huthmacher, 2807 Country Club Blvd., Sugar Land, Tex. 77478

[21] Appl. No.: 649,062

[22] Filed: Sep. 10, 1984

[51] Int. Cl.³ ............................................. A01D 53/14
[52] U.S. Cl. ..................................... 56/17.5; 56/17.1; 280/47.2; 172/17
[58] Field of Search ................. 56/12.7, 16.7, 17.1, 56/17.2, 17.5; 280/47.13 R, 62, 47.2, 43.1, DIG. 6; 172/14, 17

[56] References Cited

U.S. PATENT DOCUMENTS

| 3,561,199 | 2/1971 | Lay | 56/17.1 |
| 3,977,078 | 8/1976 | Pittinger | 56/12.7 |
| 4,182,100 | 1/1980 | Letter | 56/16.7 |
| 4,343,139 | 8/1982 | Lowery et al. | 56/17.5 |
| 4,389,836 | 6/1983 | Lowery et al. | 56/12.7 |
| 4,411,126 | 10/1983 | Lowery et al. | 56/12.7 |

FOREIGN PATENT DOCUMENTS 1551622  8/1979  United Kingdom ................ 56/12.7

Primary Examiner—Hugh R. Chamblee
Assistant Examiner—John G. Weiss
Attorney, Agent, or Firm—Michael P. Breston

[57] ABSTRACT

The wheeled assembly supports and converts a hand-held power grass trimmer device into a wheeled power mower. The assembly includes a wheeled frame and a two-part detachable joint. The frame is mounted on ground-engaging, support wheels. The two-part joint includes (1) a bracelet which is fixably and releasably mounted on the trimmer's shaft without impairing the operator's ability to hand manipulate the trimmer when it is fully detached from the frame, and (2) a casing secured to the frame which detachably receives and holds the bracelet together with its shaft in a predetermined upstanding and inclined position against downward and rotational movements, but leaves the casing free to release the lock between the bracelet and the casing when a pull is exerted on the trimmer handle in an upward direction along the longitudinal axis of the trimmer shaft.

12 Claims, 10 Drawing Figures

U.S. Patent   Jul. 30, 1985   Sheet 1 of 2   4,531,350
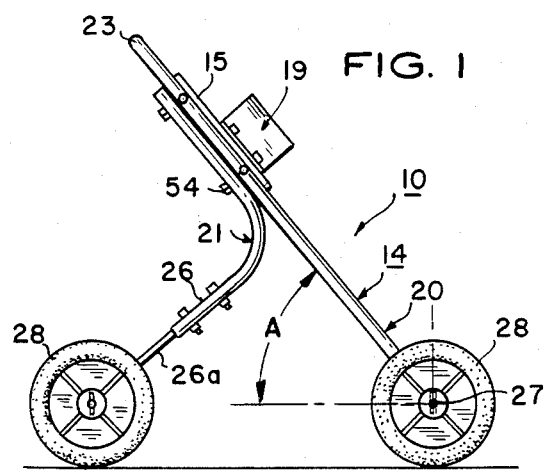
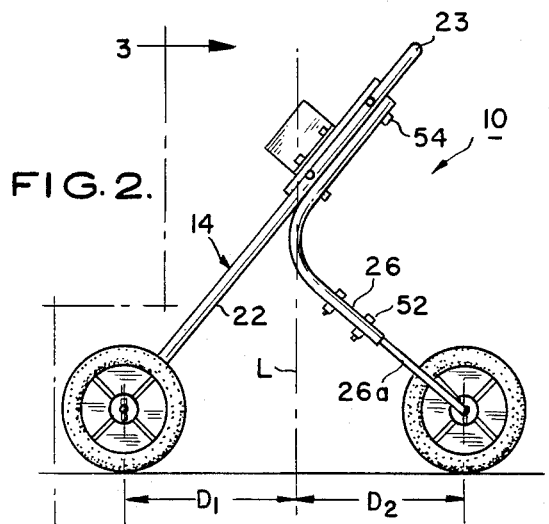
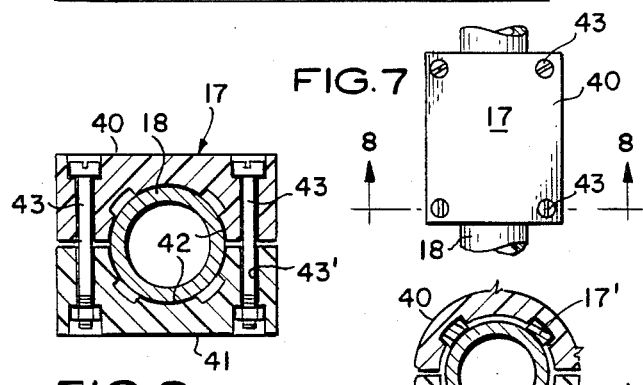
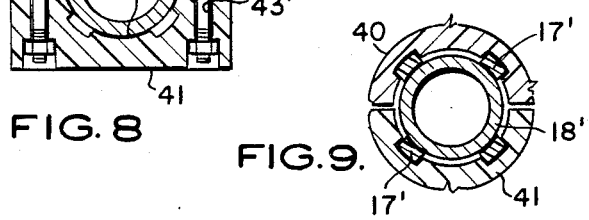
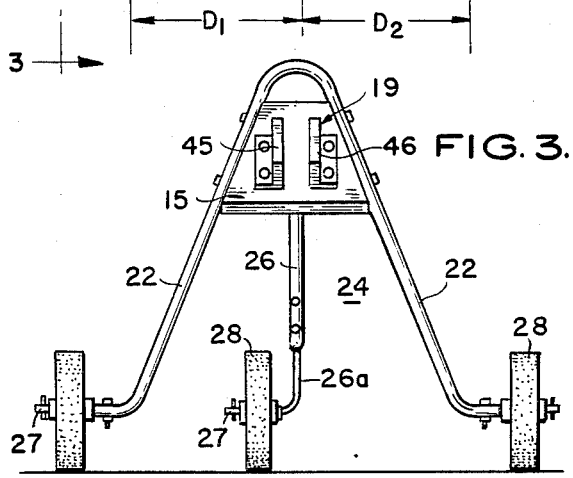
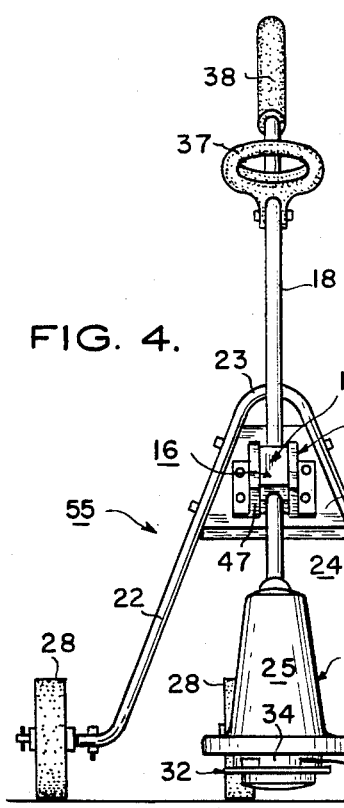
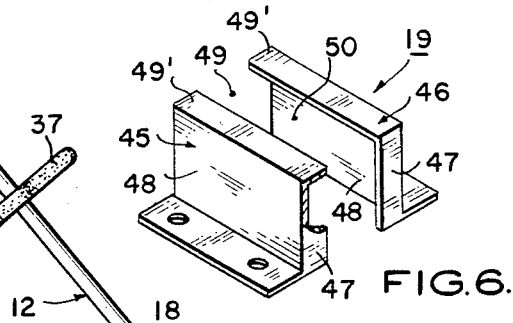
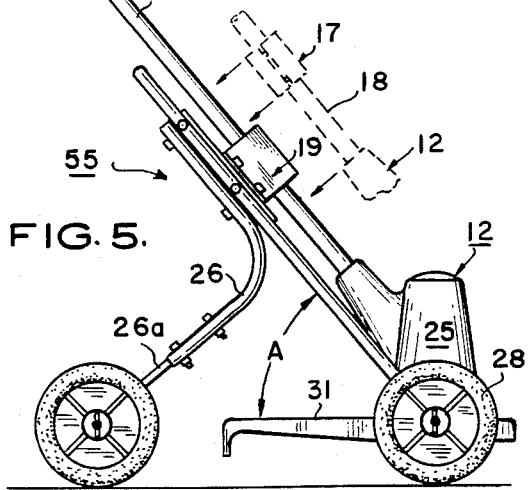

UNIVERSAL WHEELED ASSEMBLY FOR GRASS TRIMMERS

BACKGROUND OF THE INVENTION

1. Field of the Invention

This invention relates to a universal wheeled assembly which can be easily and releasably attached to conventional line-type powered grass trimmers, in order to selectively convert them into wheeled lawn mowers without affecting their trimming ability when they are hand held.

2. Description of the Prior Art

Line-type grass trimmers have been known and used for many years. From their introduction, their use spread very rapidly to become common household tools. They are particularly attractive to home owners with small yards because they can be used to trim around obstructions and to mow grass in unobstructed areas as well. In addition, their relatively small size compared to regular lawn mowers makes them easy to store, especially for town home owners who prefer to have a single, modestly priced electric trimmer, to accomplish both trimming and mowing operations, rather than have a separate lawn mower and a separate trimmer.

A typical such electric trimmer has an electric cord extending through a hollow tubular shaft at the bottom end of which is a motor housing surrounded by an enlarged peripheral skirt portion. Protruding from the bottom of the motor housing and coupled to the motor's shaft is a grass-cutting head having a circular rotor to which is attached interiorily thereof, a plastic line that provides to the exterior a constant-length line segment which acts as the cutting element for the trimmer.

A grip handle allows one hand of the user to support and guide the grass-cutting head in spaced relation to the ground and into the grass patch to be cut. A motor-control handle at the uppermost end of the shaft and above the grip handle allows the other hand to control the operation of the motor.

Such hand held operation is characterized by a grass cut of uneven height, because it is difficult for the operator to continuously maintain the cutting head at the same height above the ground.

Also, the weight of such trimmers has proved to be an impediment to their use. The weight of a trimmer can contribute to the user's early fatigue, especially when it is used over steep terrain, and where it is difficult for the operator to maintain a balanced foothold.

From their early introduction, there was therefore a continuous need to mount such trimmers on wheels in order to prevent early operator fatigue and to obtain a uniform and even-height grass cut. That need and the various solutions offered to fill that need are described in one or more of the following illustrative U.S. Pat. Nos. 4,442,659; 4,428,183; 4,411,126; 4,389,836; 4,343,139; 4,341,060; 4,287,709; 4,182,100; 3,996,729; 3,774,379.

In general, the known wheeled, trimmer-type lawn mowers have one or more of the following drawbacks: they are cumbersome for use over irregular and obstructed landscapes because they require that the operator use both of his hands: one to hold the motor-control handle of the trimmer, and the other one to steer the trimmer with the handle which is on the wheeled carriage on which the trimmer is mounted; they require too many parts and therefore are too expensive to make; they are not universal in the sense that they are designed to accommodate only a particular type of trimmer; they are bulky and require excessive storage space; they make it relatively difficult to mount and dismount the trimmer on and from the wheeled carriage and such mounting typically requires tools; and users, especially women find it hard to adjust the inclination of the trimmer's shaft and the elevation of the cutting head above ground.

Accordingly, it is a main object of this invention to overcome the above-mentioned and other known drawbacks of known line-type lawn mowers, and to provide a novel universal wheeled assembly in order to allow the operator of a conventional grass trimmer to instantaneously change it from wheel-mounted mowing to hand-held trimming, and vice versa.

It is another object of this invention to provide a new and improved wheeled, trimmer-type lawn mower which employs the motor-control handle on the shaft of a conventional trimmer for a dual purpose: the conventional purpose of controlling the trimmer's motor, and the added purpose of steering a wheeled frame which has no handle, and to which frame the conventional trimmer becomes releasably jointed in a well-balanced manner by a two-part joint, one joint part being positioned on the trimmer shaft without modifying the shaft in any manner whatsoever, and the other joint part being mounted on the wheeled frame; which allows the one part to remain on the shaft permanently without interfering with the functioning of the trimmer when it is separated from the frame; which requires no tools to make or separate the joint between the frame and the trimmer shaft; and which is simple in design, compact in use, light-weight, and inexpensive to manufacture.

SUMMARY OF THE INVENTION

The wheeled assembly supports and converts a hand-held power grass trimmer device into a wheeled power mower, and thus into a dual purpose tool for making easy hand-held trimming operations as well as wheel-mounted grass mowing operations, as may be required in obstruction-free and over obstructed or irregular landscapes.

The assembly includes a trimmer, a wheeled frame, and a two-part detachable joint.

The trimmer unit includes a tubular shaft, a grass-cutting head, a motor for driving the head, and a handle for holding the device and for guiding the head over the grass field to be cut. The grass-cutting head has a circular rotor from which outwardly extends a plastic cord segment. The rotor rotates the segment in a circular motion and at high speed to cut a swath of fixed radius.

The frame is mounted on ground-engaging, support wheels that are parallel to each other to enable the frame to move in a straight line.

The two-part joint includes (1) a bracelet which is fixably and releasably mounted on the shaft without impairing the operator's ability to hand manipulate the trimmer when it is fully detached from the frame, and (2) a casing secured to the frame which detachably receives and holds the bracelet together with its shaft in a predetermined upstanding and inclined position against downward and rotational movements, but leaves the casing free to release the lock between the bracelet and the casing when a pull is exerted on the trimmer handle in an upward direction along the longitudinal axis of the trimmer shaft.

The predetermined position of the bracelet on the shaft is selected so as to maintain the cutting head in the open space between the front wheels of the frame at a predetermined height above and parallel to the surface traversed by wheels, thereby allowing the cutting plastic cord to cut a neat swath of fixed radius and of uniform height without much effort from and fatigue by the operator. The frame is easily steered by the operator by imposing a forward or rearward force on the handle of the trimming device in a direction parallel to the wheels.

BRIEF DESCRIPTION OF THE DRAWINGS

FIG. 1 is an elevational view of the right side of the wheeled frame of the present invention;

FIG. 2 is an elevational view of the left side of the frame:

FIG. 3 is a front view of the frame on line 3—3 of FIG. 2;

FIG. 4 is an elevational front view of the fully assembled lawn mower;

FIG. 5 is an elevational right side view of the assembled lawn mower;

FIG. 6 is an isometric view of the casing part of the joint;

FIG. 7 is a top view of the bracelet part of the joint;

FIG. 8 is an enlarged sectional view of the bracelet taken on line 8—8 of FIG. 7;

FIG. 9 shows a fragmentary sectional view of the bracelet with clamping spacer shims added thereto to accommodate different diameters of the trimmer's shaft.

DESCRIPTION OF A PREFERRED EMBODIMENT

Figure 10:
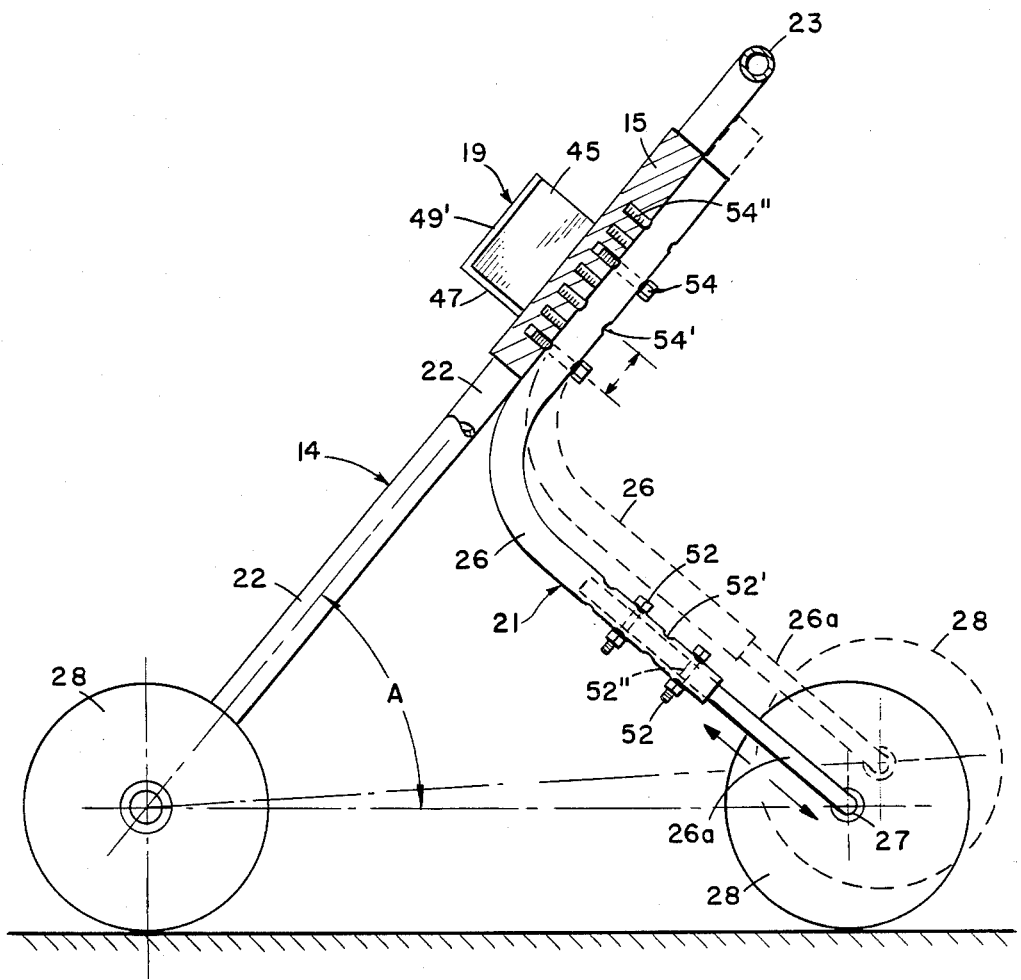
FIG. 10 is a view similar to FIG. 2 illustrating the manner of adjusting the angle of tilt for the trimmer shaft.

In the description and in the drawings, the same reference characters will be used to designate the same or similar parts whenever possible to facilitate the understanding of the invention.

The universal wheeled assembly 10 (FIGS. 1-6) of this invention includes a conventional, line-type electric grass trimmer 12, a self-supporting wheeled frame 14, and a two-part joint 16 therebetween.

Joint 16 has a bracelet 17, which is fixably and releasably mounted on the trimmer's shaft 18 without modifying the shaft in any manner whatsoever, and a casing 19 which is mounted on the front side of a flat, deck 15 forming part of frame 14. Bracelet 17 can remain permanently on shaft 18 without interfering with the operation of trimmer 12 when it is separated from frame 14.

Frame 14 includes a front frame section 20 and a rear frame section 21. Front frame section 20 has a pair of L-shaped legs 22 which branch out downwardly and forwardly from a horizontal top portion 23. Front section 20 defines in a plan view a substantially V-shaped or U-shaped open space 24 for receiving between front legs 22 the motor housing 25 of trimmer 12. From the back side of deck 15, which spans over a portion of the space 24 between legs 22, extends rearwardly and downwardly a rear, L-shaped leg 26.

Each leg has a horizontal, laterally-extending axle 27 on which is rotatably mounted a ground-engaging support wheel 28. The wheels 28 rotate in parallel planes to allow frame 14 to move in a straight line.

Trimmer 12 has an electric cord 29 extending through hollow tubular shaft 18 at the bottom end of which is motor housing 25 surrounded by an enlarged peripheral skirt portion 31. Protruding from the bottom of motor housing 25 and coupled to the motor's shaft (not shown) is a grass-cutting head 32 having a circular rotor 34 to which is attached interiorily thereof, a plastic line that feeds outside of rotor 34 a constant-length cord 36 which acts as the cutting element for trimmer 12. Shaft 18 carries a grip handle 37 and a motor-control handle 38.

In accordance with this invention, handle 38 has a dual purpose: the conventional purpose of controlling the operation of the trimmer's motor through switch 30, and the added novel purpose of steering with handle 38 the self-supporting, wheeled frame 14.

The bracelet 17 (FIGS. 7-9) comprises a pair of identical rectangular half-bracelets 40,41, each having: a continuous rectangular body of a suitable metal or plastic material, a semi-cylindrical wall 42 defined at the center of the inner periphery of the body, and transverse holes 43′ through which extend clamping bolts 43 for releasably securing bracelet 17 to shaft 18 so that both half-bracelets 40,41 fit circumferentially around opposite semi-cylindrical portions of shaft 18 in shaft-embracing relation.

FIG. 9 shows a fragmentary sectional view of bracelet 17 with clamping spacer shims 17′ added thereto to accommodate different diameters of the trimmer's shaft 18′.

Casing 19 consists of a pair of identical, laterally-spaced apart, Z-shaped retainer walls 45,46 having inwardly directed flat bottom lips 47 extending laterally toward each other from the bottom edges of the middle wall segments 48 of walls 45,46 so as to define a top opening 49 between the opposed top edges 49′ of walls 45,46. Opening 49 leads into an interior receptacle chamber 50 between walls 45,46. Bracelet 17 can be inserted into receptacle 50 in a downwardly direction until bottom lips 47 retain the bracelet and its encased shaft against further downward movement. Thus, bracelet 17 is easily movable into and out of interlocking engagement with casing 19 through opening 49.

The cross-sectional dimensions of bracelet 17 and of chamber 50 are such that casing 19 releasably receives and holds bracelet 17 together with its shaft 18 in a predetermined upstanding and inclined position against downward and rotational movements, but leaves casing 19 free to release the lock between bracelet 17 and casing 19 when a pull is exerted on shaft 18 in an upward direction along its longitudinal axis.

For a typical straight shaft 18, its longitudinal axis must form an angle A (FIGS. 5 and 10) between the frame section 22 and a horizontal line extending through the axes of the front and rear wheels 28 which are of equal diameter, to allow cutting head 32 to become parallel to the plane of cut. The most common values for tilt angle A are 30 and 45 degrees. Angle A can be coarsely varied by adjusting the position of bolts 52 which interconnect rear leg 26 with its extension rod 26a, and it can also be finely varied by adjusting the position of bolts 54 which interconnect the upper end of leg 26 with the back side of deck 15 on frame 14. For that purpose the lower end of tubular leg 26 is provided with appropriately spaced apart holes 52′, and its upper end with holes 54′. Extension rod 26a and deck 15 have matching holes 52″ and 54″, respectively. It will be noted that the lower end of extension rod 26a is L-shaped to provide an axle portion 27.

Assembly 10 of this invention converts trimmer device 12 into a wheeled power mower 55 (FIGS. 4-5) and thus into a dual purpose tool for making easy hand-held trimming operations as well as wheel-mounted grass mowing operations, as may be required in obstruction-free and over obstructed or irregular landscapes. In particular, joint 16 enables the operator to instantaneously change from wheel-mounted mowing to hand-held trimming, and vice versa, and allows self-supporting frame 14 to become easily and releasably attached to trimmer 12, without requiring tools for that purpose. Thus the operator has the choice, at any time during a grass cutting operation, to selectively convert trimmer 12 into a wheeled lawn mower 55, without affecting the trimming ability of trimmer 12 when it is hand held and detached from frame 14.

When trimmer 12 is detached from frame 14, one hand grasps guide handle 37 and the other hand holds handle 38 through whose switch 30 the operation of rotor 34 is controlled. In this manner, the user can with one hand support and guide grass-cutting head 32 in spaced relation to the ground and into a grass patch to be cut, while with his other hand he can control the operation of rotor 34.

When used as a lawn mower, trimmer 12 is attached to frame 14 and its rotor 34 rotates cord 36 in a circular motion at a very high speed in a substantially horizontal plane. Cord 36 can cut an even-height grass cut or swath of fixed radius. The user can easily steer frame 14 by imposing a forward or rearward force on handle 38 in a direction parallel to its wheels.

The angle of inclination A of front frame section 20 relative to ground is coarsely adjustable by extending or shortening the length of rear leg 26, and it is finely adjustable by selecting the position at which leg 26 is attached to deck 15. Angle A is also the angle of inclination of the cutting head 32 with respect to the underlying ground surface engaged by wheels 28. The predetermined position of bracelet 17 on shaft 18 is selected so that the cutting head 32 is positioned in the open space 24 between the front wheels at a predetermined height above and parallel to the surface traversed by the wheels, thereby allowing the cutting cord 36 to cut a neat swath of fixed radius and of uniform height without much effort from and fatigue by the operator, and without detriment to the operator's ability to hand manipulate trimmer 12 when it is fully detached from frame 14. By changing the position of bracelet 17 on shaft 18, it is possible to change the height at which the grass will be cut.

Preferably, a vertical line L (FIG. 2) intersects the lowermost end of casing 19 to permit bracelet 17 to become spaced approximately halfway between the axes of the front and rear axles 27. Such spacing allows the weight of trimmer 12 to be evenly distributed on all wheels 28. In FIG. 2, $D_1 = D_2$ and therefore the plane containing line L is a plane of symmetry.

It will be appreciated that the novel wheeled assembly 10 is simple in design, compact in use, light-weight, and inexpensive to manufacture.

It will also be appreciated that the objects set forth above have been accomplished while other advantages and modifications will readily become apparent to those skilled in the art.

What I claim is:

1. An assembly for supporting and converting a power grass trimmer device into a power mower, the trimmer device including a tubular shaft, a grass-cutting head at one end of the shaft, and a handle at the opposite end of the shaft, comprising:
   an upstanding wheeled frame having at least a rear leg, a pair of front legs defining an open space for accepting said head therebetween;
   releasable joint means having a first part mounted on the shaft and a cooperative second part mounted on the frame, said joint means being adapted to detachably join the shaft to the frame and in a predetermined upstanding and inclined position against downward and rotational movements thereof, without restricting the shaft from moving upward relative to the frame; and
   the frame being steerable by imposing a forward or rearward force on said handle of the trimmer in a direction parallel to the wheels, thereby selectively converting the trimmer into a lawn mower.

2. A wheeled assembly for supporting and converting a power grass trimmer into a power mower for easy hand-held and wheel-mounted grass mowing operations, as may be required in unobstructed and obstructed areas, the trimmer including a tubular shaft, a grass-cutting head, a motor for driving the head, and handle means for holding and operating the trimmer and for guiding the head over the grass to be cut, the grass-cutting head having a circular rotor including a cutting element which rotates in a circular motion at high speed in a plane of cut, the improvement comprising:
   a wheeled frame mounted on ground-engaging support wheels which are parallel to each other to enable the frame to move in a straight line;
   releasable joint means mounted on the shaft of the trimmer and on the frame for detachably receiving and locking the shaft to the frame in a predetermined upstanding position against downward and rotational movements thereof, and the shaft being free to move upwardly away from the wheels by exerting a pull on the shaft in an upward direction along the longitudinal axis of the shaft, said predetermined upstanding position of the shaft being such as to maintain said grass-cutting head in the open space between the front wheels at a constant height above the surface traversed by the wheels, without impairing the operator's ability to hand manipulate the trimmer when its shaft is detached from the frame; and
   the frame being steerable by the operator by imposing a forward or rearward force on the handle of the trimmer in a direction parallel to the wheels.

3. The assembly of claim 2, wherein
   said joint means having a bracelet detachably and releasably securable to the shaft, and a casing mounted on the frame for detachably receiving said bracelet and its shaft.

4. The assembly of claim 3, wherein
   the bracelet comprises a first bracelet member and a second bracelet member, both members fitting circumferentially around opposite halves of said shaft, and each member having transverse holes therethrough for accepting clamping bolts therein for securing said bracelet members to said shaft.

5. The assembly of claim 4, wherein
   the bracelet has a substantially rectangular cross section and the casing has a mating, generally C- shaped, bracelet-receiving receptacle, for receiving said bracelet through a top opening in said receptacle.

6. The assembly of claim 2, wherein
the frame includes a front frame section and a rear frame section which is adjustable in upstanding position relative to the front frame section to thereby vary the angle of inclination of the cutting head with respect to the underlying ground surface engaged by the wheels.

7. The assembly of claim 6, wherein
the front frame section includes a pair of front upstanding forked legs, each leg being a tubular member defining at its outer end a wheel-mounting axle and a wheel rotatably supported thereon.

8. The assembly of claim 7, wherein
the frame carries three supporting wheels: a pair of front wheels and a single rear wheel.

9. The assembly of claim 8, and
a support deck mounted on the central portion of said front frame section between said front legs, and
said casing being mounted on the deck.

10. The assembly of claim 7, wherein
the front frame is defined by a single tubular member.

11. The assembly of claim 5, wherein
the casing has a pair of opposed side walls, a pair of spaced-apart bottom retaining wall segments, and a pair of spaced-apart front retaining wall segments.

12. In combination,
a power grass trimmer including a tubular shaft, a grass-cutting head, a motor for driving the head, and handle means for holding and operating the trimmer and for guiding the head over the grass to be cut, the grass-cutting head having a circular rotor including a cutting element which rotates in a circular motion at high speed in a plane of cut;
a wheeled frame for supporting and converting the trimmer into a power mower for hand-held and wheel-mounted grass cutting operations as may be required in unobstructed and obstructed areas, said frame being mounted on ground-engaging support wheels which are parallel to each other to enable the frame to move in a straight line;
a two-part releasable joint means having one part mounted on the shaft of the trimmer and the other part mounted on the frame for detachably receiving and locking the shaft to the frame in a predetermined upstanding and inclined position against downward and rotational movements thereof, and the shaft being free to move upwardly away from the wheels by exerting a pull on the shaft in an upward direction along the longitudinal axis of the shaft,
said predetermined position of said shaft being such as to maintain the grass-cutting head in the open space between the wheels at a constant height above and parallel to the surface traversed by the wheels; and
the frame being steerable by the operator by imposing a forward or rearward force on the handle means of the trimmer in a direction parallel to the wheels.

* * * * *